(12) United States Patent
Hubbard et al.

(10) Patent No.: US 8,905,279 B2
(45) Date of Patent: Dec. 9, 2014

(54) LOAD CARRIER

(75) Inventors: Peter Douglas Hubbard, Christchurch (NZ); Bruce John Robertson, Christchurch (NZ)

(73) Assignee: Hubco Automotive Limited, Wellington (NZ)

( * ) Notice: Subject to any disclaimer, the term of this patent is extended or adjusted under 35 U.S.C. 154(b) by 157 days.

(21) Appl. No.: 13/577,831

(22) PCT Filed: Feb. 8, 2011

(86) PCT No.: PCT/NZ2011/000018
§ 371 (c)(1),
(2), (4) Date: Nov. 2, 2012

(87) PCT Pub. No.: WO2011/096832
PCT Pub. Date: Aug. 11, 2011

(65) Prior Publication Data
US 2013/0043287 A1 Feb. 21, 2013

(30) Foreign Application Priority Data
Feb. 8, 2010 (NZ) .......................................... 583170

(51) Int. Cl.
*B60R 9/055* (2006.01)
(52) U.S. Cl.
USPC ...................................................... 224/328
(58) Field of Classification Search
CPC ........ B60R 9/045; B60R 9/055; B60R 9/058; B60R 9/04; B60R 9/00; B60R 2011/0028
USPC ......... 224/328, 309, 317, 315, 321, 323, 329, 224/330
See application file for complete search history.

(56) References Cited

U.S. PATENT DOCUMENTS 3,660,198 A    5/1972   Thiel
3,685,061 A *  8/1972   Wray ................................ 5/119

(Continued)

FOREIGN PATENT DOCUMENTS

DE       3128842 A1     2/1983
DE       3618791 A1    12/1987
WO    2009158727 A1    12/2009

OTHER PUBLICATIONS

Canadian Intellectual Property Office, Office action regarding Canadian Patent Application No. 2,793,344, Nov. 1, 2013, 2 pages.

(Continued)

*Primary Examiner* — Brian D Nash
(74) *Attorney, Agent, or Firm* — Kolisch Hartwell, P.C.

(57) ABSTRACT

The invention relates to a roof box 1 for mounting to a vehicle via roof racks 100. The roof box 1 includes a base section 3 mountable to a vehicle roof or roof rack 100 and a top section 2 that is movable relative to the base section 3 to allow the roof box 1 to be opened and closed. The roof box 1 includes no external protruding seam 4 with the seam 4 flush with the exterior of the roof box 1. The roof box 1 also includes a curved seam 4, double skinned top 2 and double acting action hinge 12 design that all combine to provide improved aesthetics, lower weight, reduced aerodynamic drag, better fuel efficiency and equivalent strength, rigidity and loadings to the art.

13 Claims, 11 Drawing Sheets

(56) References Cited

U.S. PATENT DOCUMENTS

| | | | |
|---|---|---|---|
| 3,861,572 A * | 1/1975 | Norris et al. | 224/315 |
| 3,915,362 A | 10/1975 | Hart | |
| 4,406,387 A * | 9/1983 | Rasor | 224/328 |
| 4,771,940 A | 9/1988 | Taylor | |
| 4,790,256 A | 12/1988 | Levine | |
| 4,953,673 A | 9/1990 | Ambasz | |
| 4,974,766 A | 12/1990 | DiPalma et al. | |
| 5,160,075 A | 11/1992 | Moscovitch | |
| 5,288,003 A | 2/1994 | MacDonald | |
| 5,538,169 A | 7/1996 | Moore | |
| 5,582,313 A * | 12/1996 | Envall | 220/4.28 |
| 5,667,116 A * | 9/1997 | Reinhart et al. | 224/319 |
| 5,713,498 A * | 2/1998 | Cucci | 224/328 |
| 5,827,036 A * | 10/1998 | Steffes et al. | 414/462 |
| 6,422,567 B1 | 7/2002 | Mastrangelo et al. | |
| 6,918,521 B2 * | 7/2005 | Settelmayer et al. | 224/319 |
| 6,997,497 B2 * | 2/2006 | Sagi et al. | 296/37.7 |
| 7,258,260 B2 * | 8/2007 | Hurd | 224/319 |
| 7,416,098 B2 * | 8/2008 | Settelmayer et al. | 224/319 |
| 2004/0155081 A1 * | 8/2004 | Settelmayer et al. | 224/319 |
| 2004/0256427 A1 * | 12/2004 | Settelmayer et al. | 224/319 |
| 2005/0045678 A1 * | 3/2005 | Hurd | 224/319 |
| 2005/0145639 A1 | 7/2005 | Viklund et al. | |
| 2005/0194414 A1 * | 9/2005 | Lynch | 224/401 |
| 2006/0032878 A1 * | 2/2006 | Settelmayer et al. | 224/319 |
| 2006/0043130 A1 * | 3/2006 | Dabrowski | 224/328 |
| 2007/0114256 A1 * | 5/2007 | Rodden et al. | 224/328 |
| 2007/0164066 A1 | 7/2007 | Jones | |
| 2007/0205240 A1 * | 9/2007 | Castro et al. | 224/328 |
| 2008/0017679 A1 | 1/2008 | LeBlanc et al. | |
| 2008/0169322 A1 * | 7/2008 | McMillan | 224/328 |
| 2010/0084447 A1 * | 4/2010 | Elliott et al. | 224/319 |
| 2011/0186608 A1 * | 8/2011 | Sautter et al. | 224/328 |
| 2012/0111910 A1 * | 5/2012 | Sautter et al. | 224/309 |
| 2012/0228349 A1 * | 9/2012 | Sautter et al. | 224/328 |
| 2012/0292358 A1 * | 11/2012 | Brej et al. | 224/309 |

OTHER PUBLICATIONS

International Searching Authority of the Australian Patent Office regarding PCT Application No. PCT/NZ2011/000018, "Notification of Transmittal of the International Search Report and the Written Opinion of the International Searching Authority, or the Declaration" dated Jun. 7, 2011, 16 pages.

European Patent Office, Extended European Search Report regarding European Patent Application No. EP11740097.8, Jun. 20, 2013, 3 pages.

* cited by examiner

LOAD CARRIER

RELATED APPLICATIONS

This application derives priority from the provisional specification allocated the application number NZ583170, the contents of which are incorporated herein by reference.

TECHNICAL FIELD

The invention relates to a load carrier. More specifically, the invention relates to a vehicle roof box used to carry items on the roof of a vehicle.

BACKGROUND ART

Roof boxes are well known and commercialised worldwide. Roof boxes comprise a container mountable to a roof area of a vehicle and are adapted to store luggage, cargo and/or other objects (e.g. sporting equipment such as skis and snowboards). Typically, the roof box is made up of a bottom part for mounting to the roof area of a vehicle and a top part movable relative to the bottom part for opening and closing the roof box. Roof boxes may be preferable to an open roof rack accessory holder since they protect the items stored inside from exposure to adverse weather and environmental conditions as well as provide robust protection against theft and vandalism.

There are a wide range of different styles, features and prices available although roof boxes have become very standardised in design. In particular, typical design features common to many designs include central locking, double sided opening, quick fit attachment from inside the roof box, the ability to fit a range of roof racks and various styling shapes.

Noted drawbacks with existing designs included increased fuel consumption due to greater aerodynamic drag, styling constraints by existing manufacturing methods, the roof boxes are difficult and slow to attach and remove, and the internal space is reduced by the use of internal attachment mechanisms.

More specifically, all roof boxes known to the applicant utilise an over lapping seam design i.e. the lid overlaps the base. Whilst this is easy to manufacture and seals well, the styling and aesthetics are not ideal and the design causes noticeable drag. The drag also may result in increased noise when the vehicle is driven.

It is an object of the present invention to address the foregoing problems or at least to provide the public with a useful choice.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the present invention will become apparent from the ensuing description that is given by way of example only.

SUMMARY OF THE INVENTION

The invention broadly relates to a roof box with flush seams that improves the styling of the box and improves the box aerodynamics, reducing wind noise and fuel consumption compared to existing roof box designs.

In a first embodiment there is provided a roof box including a semi-rigid to rigid base section mountable to the roof of a vehicle and a semi-rigid to rigid top section movable relative to the base section for opening and closing the roof box wherein the exterior of the seam between the base section and top section is approximately flush when in a closed configuration.

In a second embodiment there is provided a roof box including a semi-rigid to rigid base section mountable to the roof of a vehicle and a semi-rigid to rigid top section movable relative to the base section for opening and closing the roof box wherein the roof box top section is lifted from the base section about at least one hinge wherein the virtual hinge line is located outside the roof box.

In a third embodiment there is provided a roof box including a semi-rigid to rigid base section mountable to the roof of a vehicle and a semi-rigid to rigid top section movable relative to the base section for opening and closing the roof box and further including at least one double acting hinge linking the top and base sections.

BRIEF DESCRIPTION OF THE DRAWINGS

Further, aspects of the present invention will become apparent from the following description that is given by way of example only and with reference to the accompanying drawings in which.

DETAILED DESCRIPTION

Figure 1:
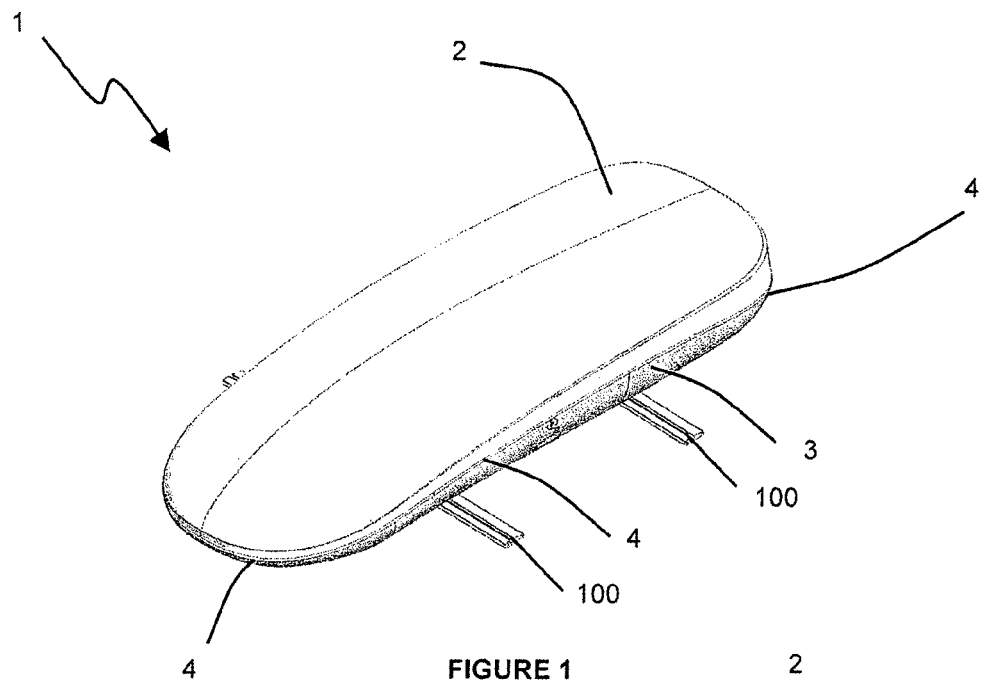
FIG. 1 illustrates a perspective view from above of one embodiment of the roof box in a closed configuration.

As noted above the invention broadly relates to a roof box with flush seams that improves the styling of the box and improves the box aerodynamics, reducing wind noise and fuel consumption compared to existing roof box designs.

For the purposes of this specification, the term 'roof box' refers to structure with an enclosure typically fixed to the roof of a vehicle such as a car used to convey luggage.

The term 'semi-rigid to rigid' refers to the item having a degree of hardness and in-flexibility in shape and configuration that is not a totally deformable material such as a net or thin sheet.

The term 'flush' refers to the top section and base section of the roof box when closed forming an approximately even or level plane exterior surface about the joint between the two sections and not having any pronounced off set at the joint.

The term 'seam' or 'join' or 'joint' in the context of the roof box described refers to the line about which the top section and base section abut each other when the roof box is in a closed configuration.

The term 'virtual hinge line' refers to an imaginary axis about which the hinge or hinges rotate.

In a first embodiment there is provided a roof box including a semi-rigid to rigid base section mountable to the roof of a vehicle and a semi-rigid to rigid top section movable relative to the base section for opening and closing the roof box wherein the exterior of the seam between the base section and top section is approximately flush when in a closed configuration.

The seam between the top and base sections may vary in height about a horizontal plane. In one embodiment, the front and rear ends of the roof box when mounted to a vehicle have a seam at a lower height relative to the seam height about the mid-section of the roof box. It should be appreciated that a variety of configurations may be possible and that the above configuration is provided by way of example only.

The top section may be hinged from the base section via hinges located along at least one longitudinal side of the roof box linking the top and base sections. In one embodiment, the roof box may include opposing hinges located on opposite sides of the walls of the roof box allowing the box to be opened from either side.

The hinge or hinges used may be designed to account for variations in seam height relative to a horizontal plane so that, when the top section of the box is hinged closed relative to the base section, the top section seam aligns with the base section seam at all points around the length of the seam. In one embodiment, the hinge or hinges used have a virtual hinge line outside the roof box. As may be appreciated, designing a hinge to account for a varied horizontal and/or vertical profile seam requires the hinge to be more than just a single pivot point hinge. Hinges in the art for roof boxes have tended to only have one pivot point and as a result, roof boxes have straight walls and the seam is across a horizontal plane. To vary the seam in the case of the single pivot hinge would result in the top section not aligning with the base section.

In one preferred embodiment, the hinge may be double acting. More specifically, the hinge action may comprise four pivot points that allow for variation in vertical movement of the top section seam relative to the hinge axis.

One particular embodiment of hinge found useful by the inventors is a sash hinge. The sash hinge may include: a mounting connected to the base section; two link arms connecting the mounting to a connecting arm; and a connecting arm that communicates movement between the link arms and top section.

In one embodiment, the connecting arm of the hinge or hinges may be fastened to the top section of the roof box and the mounting of the hinge or hinges may be releasably retained within one or more housing brackets fastened to the base section of the roof box. In this embodiment, the hinge may move in and out of the housing when the roof box top section is opened. This configuration is useful in applications where hinges are located on either side of the roof box as the top section may be opened from either side. More specifically, when one side is opened, the hinge or hinges at the closed side of the roof box remain fixed in the housing bracket or brackets while the hinge or hinges on the opposing opening side remain fixed to the top section and the connecting arm(s), link arms and mounting lift out of the housing bracket as the top section is opened. When the top section is closed, the mountings of the hinge or hinges return back into the housing bracket or brackets. The top section of the roof box may then be opened from the opposing side reversing the above mechanics.

The hinge or hinges described above may include at least one interlock to reduce vertical movement of the roof box top section. The interlock may be designed to engage when the hinge is forced in a predominantly upward/vertical direction as opposed to a pivoting action when used in a normal hinge operating mode. The vertical motion causes two interlocking catches to be forced together as the hinge linkages move thereby preventing any further upwards motion. When the upward force is removed, the hinge relaxes to a resting position where the catch interlocks no longer engage. The hinge may be forced to a relaxed position via a bias means such as a spring. When the hinge is used in a normal opening action the pivoting track (rather than vertical track) of the hinge avoids the interlock being engaged and the roof box top section is free to open.

The seam between the base and top sections may include two mating angled facing edges concealed behind a lip protruding from the top section over a portion of the exterior of the base section when the roof box is in a closed position. In an alternative embodiment, the seam may include an angled shoulder recess protruding inwards from the base section edge that receives the edge of the top section.

A resilient and deformable seal may be located between the top and base sections. In one embodiment, the seal may be affixed to the top section on the top section mating angled face edge. The seal may extend around the length of the roof box seam. The seal may be a hollow seal such as a D-cross section seal, Alternatively, the seal may be a flat seal. In a further alternative, the seal may be fixed to the base section and have a protruding hinged flap that abuts the top section when the top is closed against the base section. In all cases, the seal may be manufactured from a resilient deformable material so that when the roof box is closed, the seal may be partially deformed thereby forming a barrier to moisture entry between the mating angled facing edges.

The angle of the mating facings may be approximately 30° to 60° relative to a horizontal plane.

In one embodiment, the angle may be approximately 45°. Alternatively, the angle of the base section shoulder may be approximately 30° to 60° relative to a horizontal plane. In one embodiment, the angle may be approximately 45°. This angle has been found to be helpful by the inventors. If no angle variation is used and the two surfaces simply abut each other, the seal if used, provides the primary barrier to the environment and over time may wear or in extreme conditions fail. An angled mating surface provides an additional design barrier to egress of the environment (e.g. dust, rain, snow) into the roof box cavity. In addition, as noted above, a lip protrudes from the base section seam into the box cavity area. Again, this design feature has been found to be useful to provide an additional barrier to moisture and avoids having a sharp edge on the base section edge.

The top section and/or base section may be double skinned having an outer top skin and an inner top skin fastened together, and, if used, an outer base skin and an inner base skin fastened together. In the double skin embodiment, the skin layers may be shaped to provide angled facing edges at the seam between the top and base sections. A shoulder in the inner skin may form the top facing edge. In one embodiment, only the top section is double skinned while the base section may include either no double skinned sections or instead limited areas of double skinning.

In one embodiment, the top inner skin and top outer skin may project from the top section in the shape of a lip that extends at least partially over base section seam and wherein the two skins are fastened together at this lip. Alternatively, the two skins may project as a single slim profile edge. The two skins may be fastened together via a non-mechanical fastener such as a bonding glue. In an alternative embodiment, the base section may project inwards and upwards relative to the base of the roof box thereby forming a recessed edge on which the top section may be received. In this embodiment, the recessed edge portion may further include an internal shoulder to help provide a further barrier to egress of materials from the exterior to the interior of the roof box and to give the roof box base section an smooth surface at the seam point.

Optionally, the entire top section may be removed altogether from the base section and the base section used to convey goods absent of the top section. An example of where this may be useful is in the transport of unusual shaped items. The base section interior still retains the item yet the item may protrude beyond the height limitations of the roof box top section. Goods conveyed in this manner may be retained within the base section via a cargo net, straps or other retaining device.

In a second embodiment there is provided a roof box including a semi-rigid to rigid base section mountable to the roof of a vehicle and a semi-rigid to rigid top section movable relative to the base section for opening and closing the roof box wherein the roof box top section is lifted from the base section about at least one hinge wherein the virtual hinge line is located outside the roof box.

In a third embodiment there is provided a roof box including a semi-rigid to rigid base section mountable to the roof of a vehicle and a semi-rigid to rigid top section movable relative to the base section for opening and closing the roof box and further including at least one double acting hinge linking the top and base sections.

Additional features described in reference to the first embodiment may also apply to the above second and third embodiments as described above.

Advantages of the above design should be apparent including improved aesthetics by having a flush roof box exterior. This flush finish is also advantageous is it reduces aerodynamic drag compared to other external seam designs thereby improving fuel efficiency due to the more aerodynamic profile able to be achieved along with reduced wind noise.

A further advantage of the design, particularly relating to the double skin configuration may be that it reduces the overall weight of the roof box compared to a fully moulded top and base section, whilst still retaining the desired load ratings and rigidity necessary to be functional as a roof box. For example, designed ratings are for the roof box to hold up to 75 kg in weight and retain the box contents in a sudden loading event such as a vehicle crash.

Yet another advantage of the design is that the seam needn't be along a horizontal plane as in prior art designs. Instead the seam may be of a varying level relative to a horizontal plane and the design of the box including the seam shape, the seal, the lip and the hinge design all make it possible to use a wide variety of styling options. In particular, the hinge design was important to achieve correct alignment between the base and top sections. A hinge with a virtual hinge line outside the roof box that could deal with variations in movement in a vertical and horizontal plane meant that a snug alignment could be achieved. Hinges in the art such as spring pistons, single pivot point hinges and so on cannot account for variations along a hinge line in a vertical and horizontal direction and hence limit roof box designs to a purely horizontal plane seam and with straight walled sections at the hinge points.

Finally, the roof box is useful in that it protects the items stored inside from exposure to adverse weather and environmental conditions as well as provides robust protection against theft and vandalism.

WORKING EXAMPLE

The invention is now described with reference to a detailed description of an embodiment of the roof box of the present invention.

Figure 2:
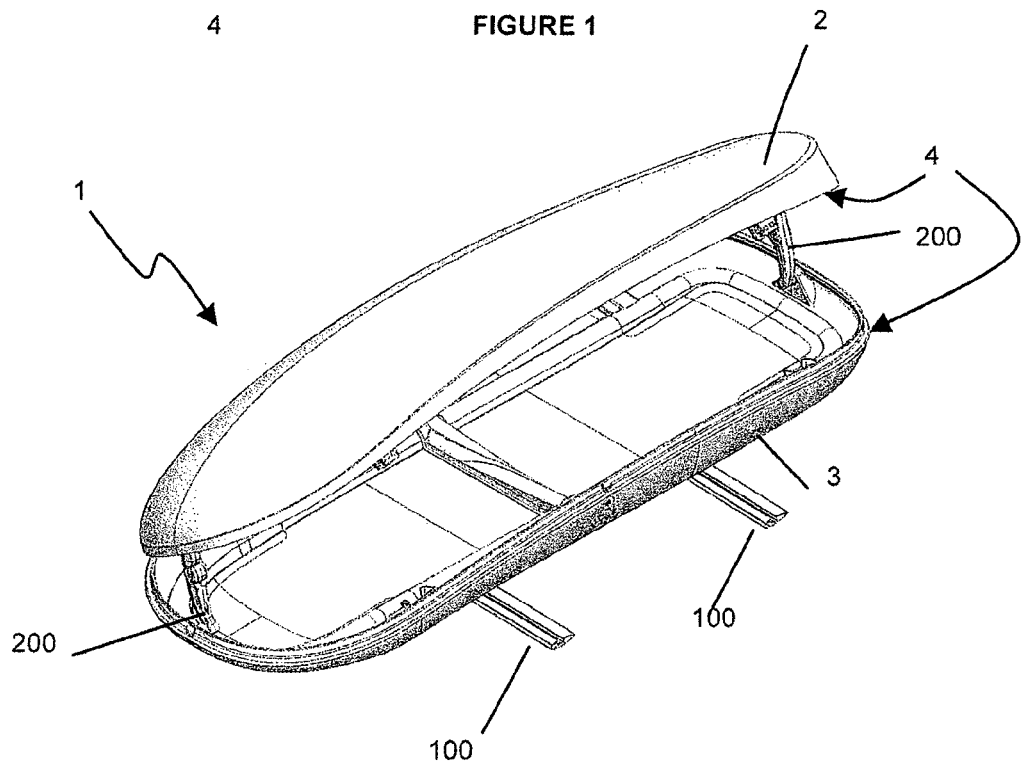
FIG. 2 illustrates a perspective view of the roof box in an open configuration.

Referring to FIG. 1, the roof box, generally indicated by arrow 1, when closed has a styled, aesthetically appealing shape. The shape also minimises drag. The roof box 1 includes a top section 2 and a base section 3 fitted to roof rack cross bars 100. The box 1 has a seam 4 between the top 2 and base 3 sections. The top 2 and base 3 sections are all that is seen when the box 1 is closed, termed for the purposes of this specification as being a 'flush seam' 4. The seal interior and associated top 2 and bottom 3 section joints are not visible from the exterior of the roof box 1 when the box is in a closed configuration as shown in FIG. 1. FIG. 2 shows an open configuration where the internal details of the seam 4 are visible along with any struts 200 that may be used. In the embodiment illustrated, the seam 4 has a styled sloping shape to match the roof box 1 shape with the seam 4 being at its highest point around the central section of the box 1 and lowered regions around the distil ends of the roof box 1 when fitted to a vehicle. It should be appreciated'that the seam 4 shape and/or profile may be varied to suit a variety of roof box 1 designs without departing from the scope of the invention.

Figure 3:
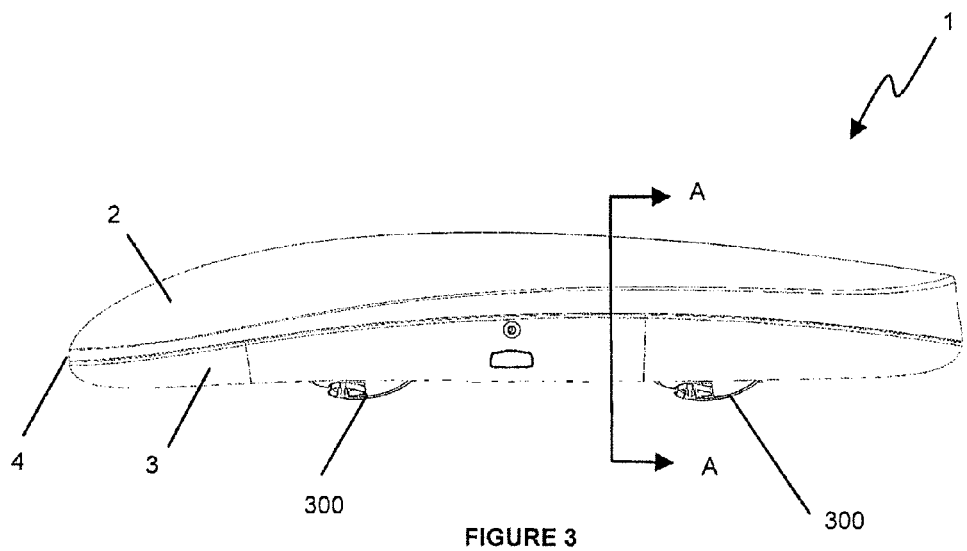
FIG. 3 illustrates an elevation view of the side of the roof box.
Figure 4:
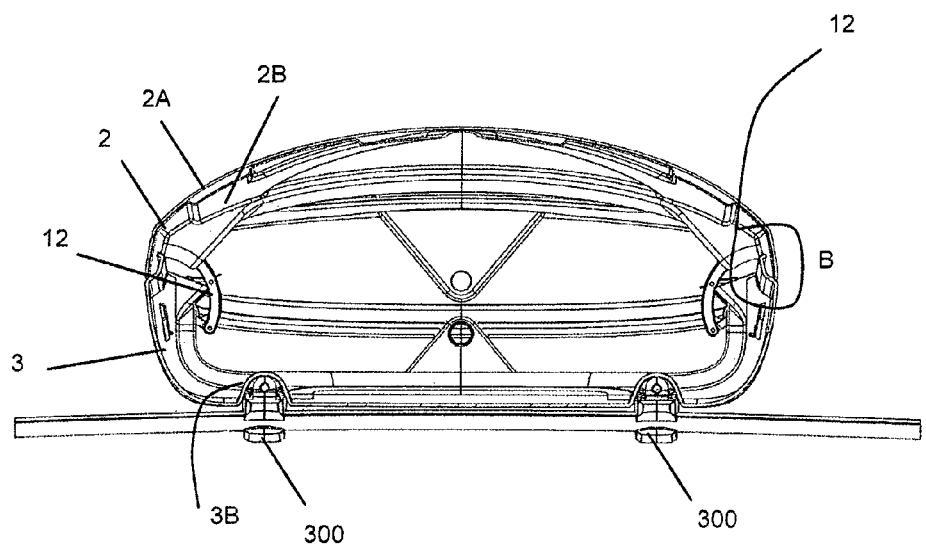
FIG. 4 illustrates a cross section front elevation view of the roof box along line AA shown in FIG. 3.
Figure 5:
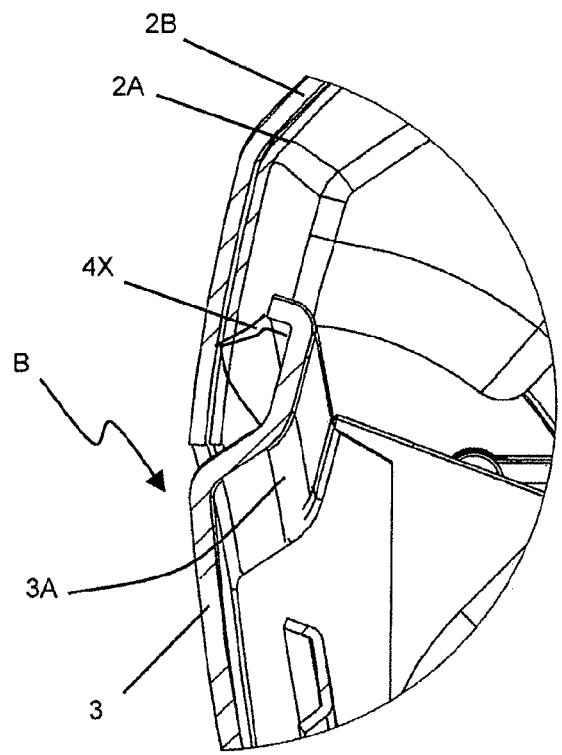
FIG. 5 illustrates a detail view of the joint between the top and bottom section of the roof box being detail B shown in FIG. 4.

FIG. 3 illustrates a side view of the closed roof box 1 and section line AA, section AA detail view being shown in FIG. 4. As shown in FIG. 4 the roof box 1 utilises double skinning in the top section 2 to achieve the desired degree of rigidity required to meet load requirements while the base section 3 includes ribbed portions 3B to provide rigidity. The hinges 12 are shown in FIG. 4 as well, being two hinges 12 on either longitudinal side of the roof box 1. As shown in detail view FIG. 5 of detail B from FIG. 4, the top section 2 includes an outer skin 2A and an inner skin 2B. The base section 3 may have strengthening sections such as double skinning as well although the embodiment shown in FIG. 5 does not include double skinning. The top section 2 at the seam 4 includes the outer skin 2A and inner skin 2B. The inner skin 2B has a shoulder forming a top section seam facing edge 3A. In the embodiment shown, the top section 2 inner skin 2B and outer skin 2A mate together to form an edge that abuts the recessed shoulder portion 3A at the opposing base section edge. The base section 3 shoulder has a base section seam facing edge 3A. The seam 4 may include a seal (shown in FIG. 5 as a flap seal 4X) between the internal edges of the roof box 1 top section 2 and base section 3. Seals may vary in cross section such as a hollow seal with a D-shaped cross section, round cross section seals and more complex shapes such as those with hinging joints or flaps. The seal if used may be adhered to the top section interior or the base section interior using, for example a chemical adhesive. The seal if used may run along the entire length of the seam 4 between the top 2 and base 3 sections. Variations may include use of a flat seal instead of a hollow seal, the key design constraint being that the seal impinges on both the top and base section seam edges sufficient to form a barrier to prevent egress of dust, rain, dirt an the like from the environment into the roof box 1. Finally, the shoulder of the base section 3A is ideally inclined at an upwards angle relative to the base section floor, in FIG. 5 shown as an approximately 45° angle to the floor of the roof box 1 base section 3. An angled shoulder from the base section 3 may be useful to ensure a snug closure, to provide an added degree of seal 4X protection and to ensure that the flush seam 4 looks aesthetically appealing from the exterior of the roof box 1. The angle also ensures that the seal 4X is less critical as it is not open to the environment but instead nested within the interior portion of seal 4.

Figure 6:
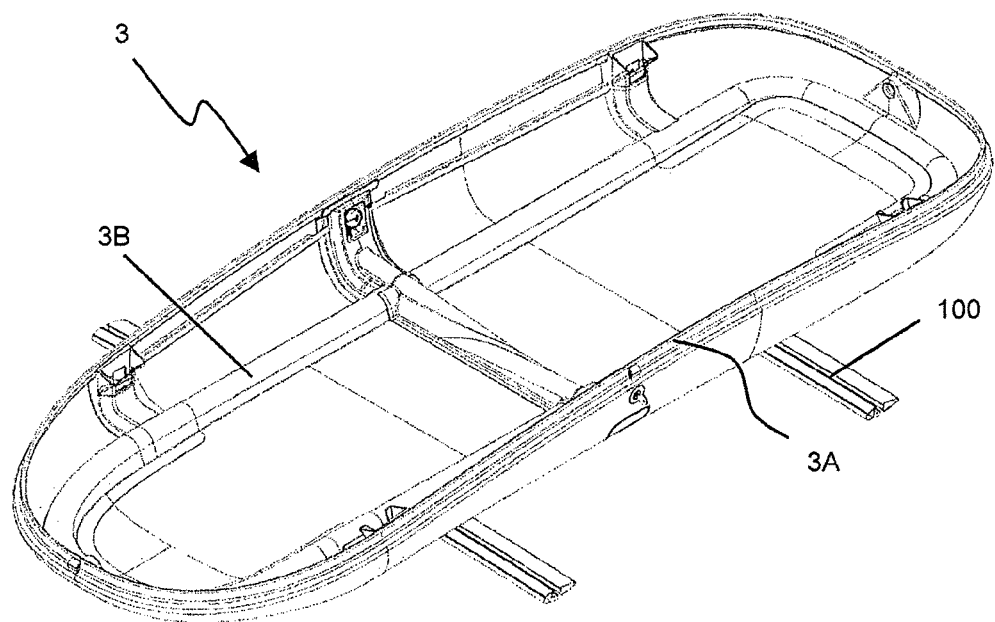
FIG. 6 illustrates a perspective view from above of the base section of the roof box with the top section removed.

FIG. 6 further illustrates one embodiment of the base section 3 of the roof box 1 including internal details such as the internal ribbed mouldings 3B that may be used to strengthen the interior. The recessed shoulder 3A is also shown in more detail. Of note is that there are few obstructions inside the box on which to catch items stored in the box 1.

Figure 7:
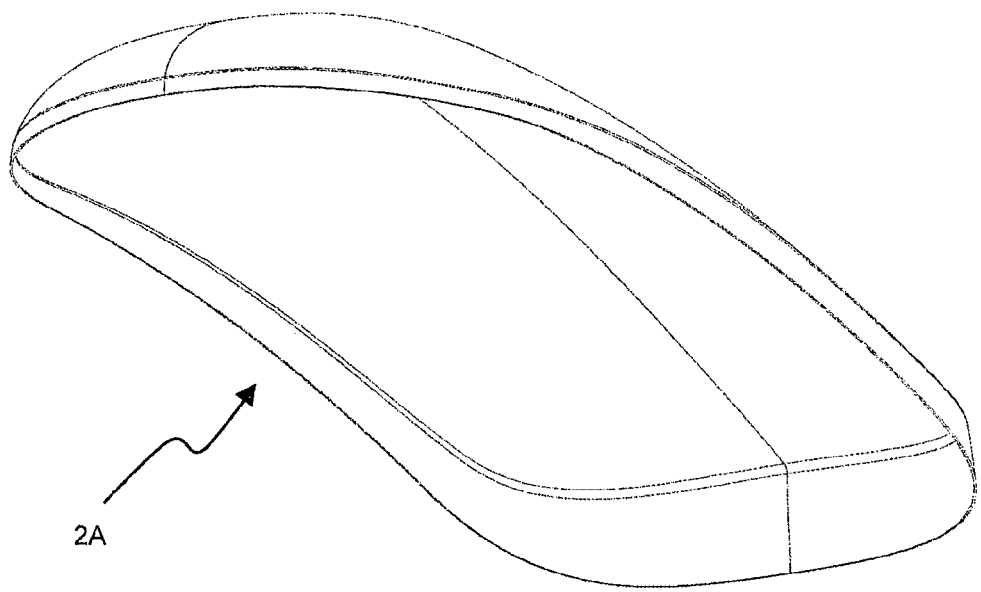
FIG. 7 illustrates a perspective view from below of the roof box top section outer skin.
Figure 8:
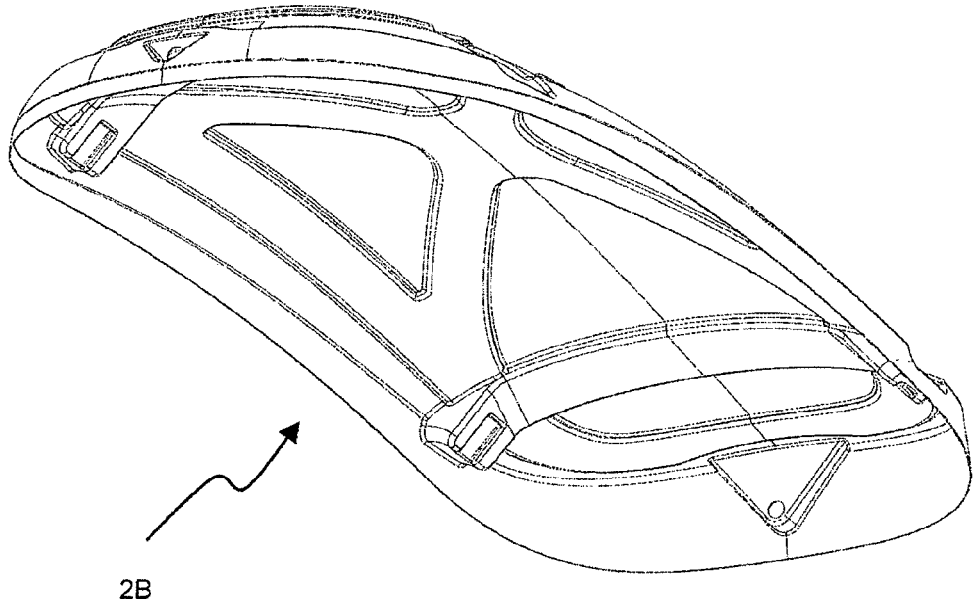
FIG. 8 illustrates a perspective view from below of the roof box top section inner skin.

FIGS. 7 and 8 illustrate the top section 2 external skin 2A and internal skin 2B in greater detail.

Figure 9A:
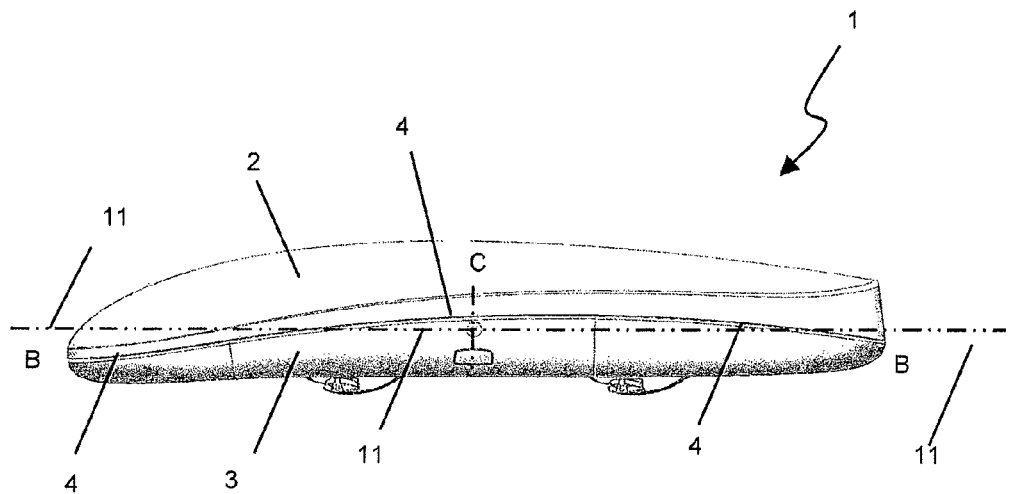
FIG. 9 illustrates a side elevation view 9A and front view 9B of the assembled roof box demonstrating the approximate position of a virtual hinge line outside the box.
Figure 9B:
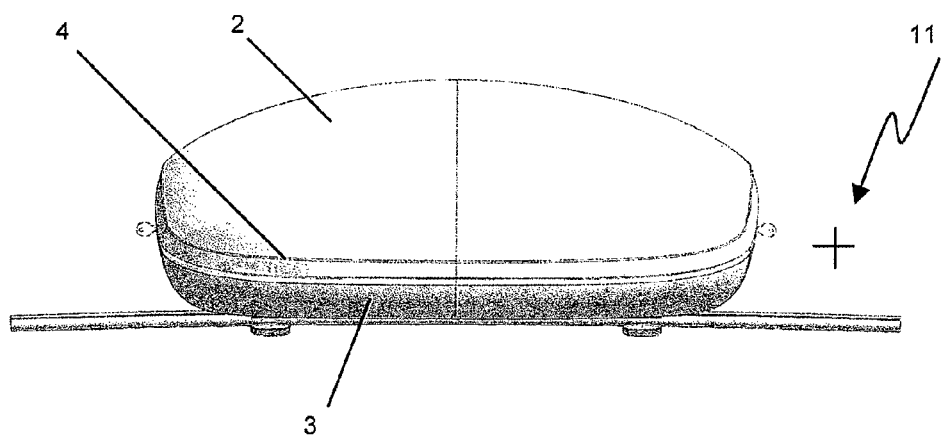

A key design difficulty in achieving the flush seam 4 exterior of the current invention roof box 1 is ensuring that the top 2 and base 3 sections seams align correctly when the roof box 1 is closed i.e. when the top section 2 is brought into contact with the base section 3. The curved styling of the box 1 and seam 4 means that the top section 2 will approach the base section 3 seam 4 at differing angles dependent on the seam 4 locations relative to a hinge point. Referring to FIG. 9, a side elevation view and front view of the roof box 1 in a closed configuration is shown. A line 11 is drawn along the length of the roof box 1 in the side elevation view FIG. 9A illustrating the approximate virtual hinge line 11. The approximate corresponding virtual hinge point is shown as a cross in the front view shown in FIG. 9B. As can be seen, the seam 4 may vary in orientation above or below the virtual hinge line 11 along the length of the roof box 1.

Figure 10:
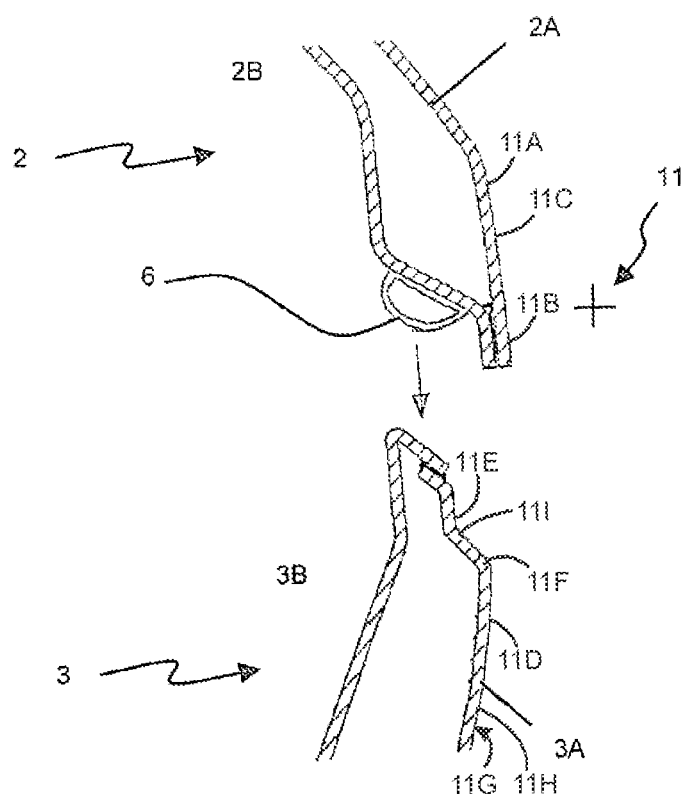
FIG. 10 illustrates a detail side elevation of one embodiment of seam illustrating the top and base sections of the roof box as they approach each other on the side opposing the hinge joint (point A as shown in FIG. 9)
Figure 11:
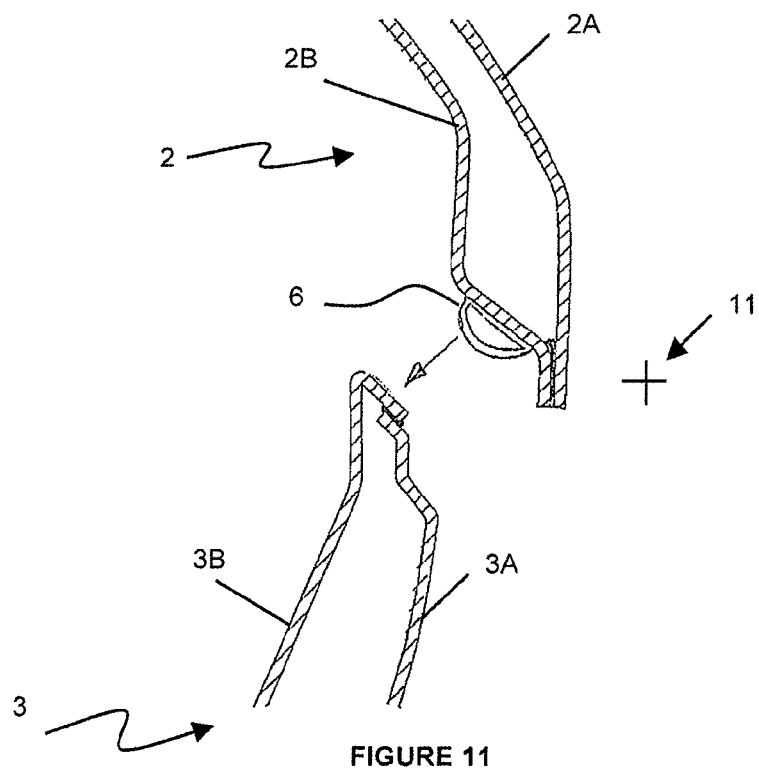
FIG. 11 illustrates a detail side elevation of the top and base sections of the roof box as they approach each other at points B as shown in FIG. 9 along the virtual hinge line being distil ends of the roof box.
Figure 12:
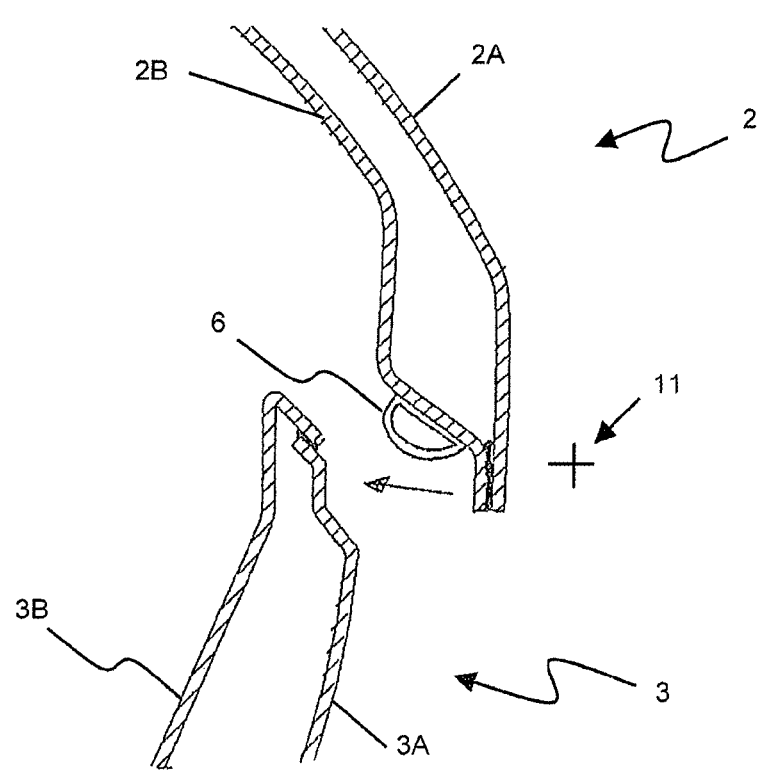
FIG. 12 illustrates a detail side elevation of the top and base sections of the roof box as they approach each other at point C as shown in FIG. 9 along the virtual hinge line being the section raised above the virtual hinge line.

Detail views illustrated in FIGS. 10 to 12 demonstrate the different angles of approach needing to be designed for. Note that FIGS. 10 to 12 illustrate a different approach to design of the seam 4 between the top 2 and base 3 sections provided to illustrate different ways that the seam 4 may be achieved. This view and the previous seam 4 detail view should not be seen as limiting.

More specifically, FIG. 10 illustrates the angle of approach between the top 2 and base 3 sections at points along the seam 4 opposing the hinge side. As demonstrated, the two sections 2,3 merge in a vertical orientation as would be expected given the proximity of this portion of the seam 4 relative to the hinge side.

By contrast, FIG. 11 illustrates the way the top 2 and base 3 sections approach each other at point B along the virtual hinge line 11. Point B is on the hinge side of the roof box 1 and as shown in FIGS. 9A and 9B, the seam 4 at point B is below the virtual hinge line 11. The resulting approach angle between the two sections 2,3 is approximately an off centre approach with the top section 2 approaching the base section 3 at a variety of acute angles including that shown in FIG. 11 being an approximately 45° angle relative to a vertical axis.

Finally, FIG. 12 illustrates the way the top 2 and base 3 sections approach each other when the box 1 is closed at point C along the virtual hinge line 11. Point C as shown in FIG. 9 corresponds to a point where the seam 4 rises above the virtual hinge line 11. In this case, and as shown in FIG. 12, the top 2 and base 3 sections approach each other in a horizontal direction. Note that in FIGS. 10 to 12, the seal 8 is illustrated as having a hollow D-shape cross-section but it should be appreciated that a variety of other configuration may also be used without departing from the scope of the invention.

As should be appreciated, designing a hinge system to cater for an aerodynamic design of this nature including a seam 4 with a varied profile results in considerable design difficulties as illustrated in FIGS. 10 to 12.

FIG. 10 shows further aspects of top section 2. The top section has a main portion 11A and an upper edge portion 11B extending downward from main portion 11A. Main portion 11A and upper edge portion 11B collectively form an outer surface 11C of the top section.

FIG. 10 also shows further aspects of base section 3. The base section has a main portion 11D and a perimeter edge portion 11E extending upward from main portion 11D. Base section 3 bends inward, toward an interior of the roof box, at a junction 11F between main portion 11D and perimeter edge portion 11E. The base section has an outer surface 11G including a main outer surface region 11H and a perimeter edge surface region 11I extending from main outer surface region 11H. Perimeter edge surface region 11I bends inward from main outer surface region 11H to form an inward offset (i.e., with an offset toward the interior of the roof box), and extends upward and inward from main outer surface region 11H and junction 11F.

Figure 13:
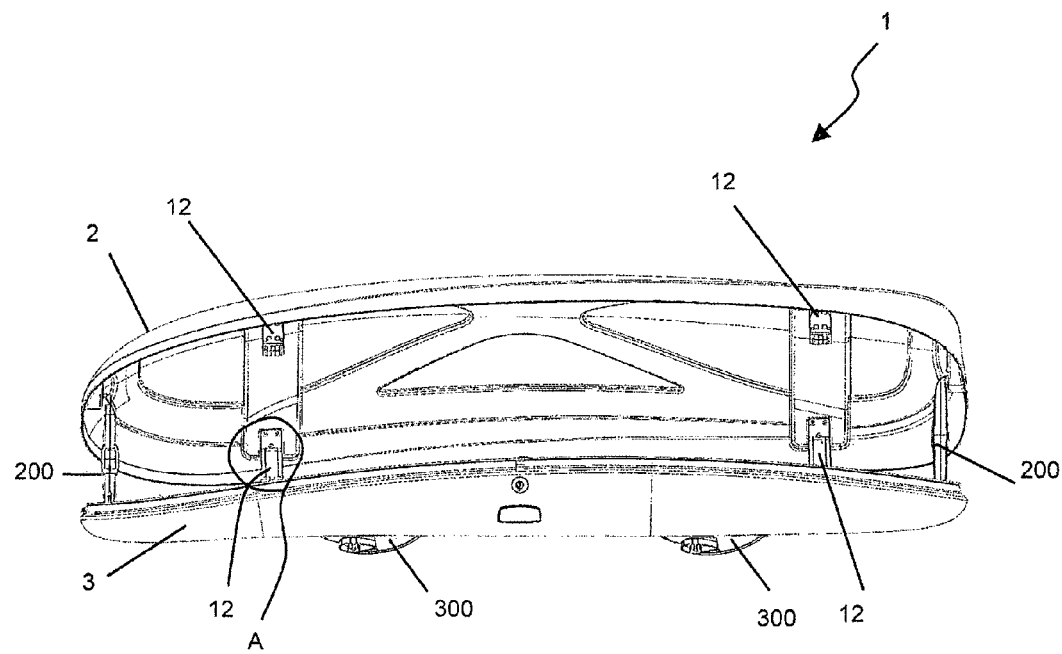
FIG. 13 illustrates a perspective view of the roof box with the top section opened revealing the hinges within the roof box.

As illustrated in FIGS. 13 to 17, a hinge 12 is also central to the roof box 1 design. Sash hinges 12 have a double acting action. In the embodiment illustrated in FIG. 13, a total of four sash hinges 12 are placed within the roof box 1 with two hinges 12 orientated on opposing sides of the roof box 1. The embodiment of FIG. 13 is designed to open from either side hence there are two sets of opposing hinges 12 in the roof box 1. The hinges 12 are mounted within the base section 3 of the roof box 1. The hinges may be received into receiving portions attached to the base section that house the hinges 12.

Figure 14:
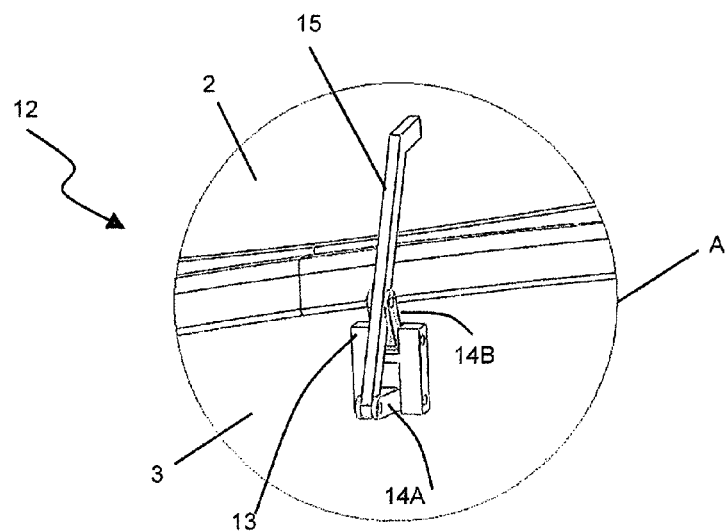
FIG. 14 illustrates a detail perspective view of a simplified embodiment hinge being detail A shown in FIG. 13.
Figure 15:
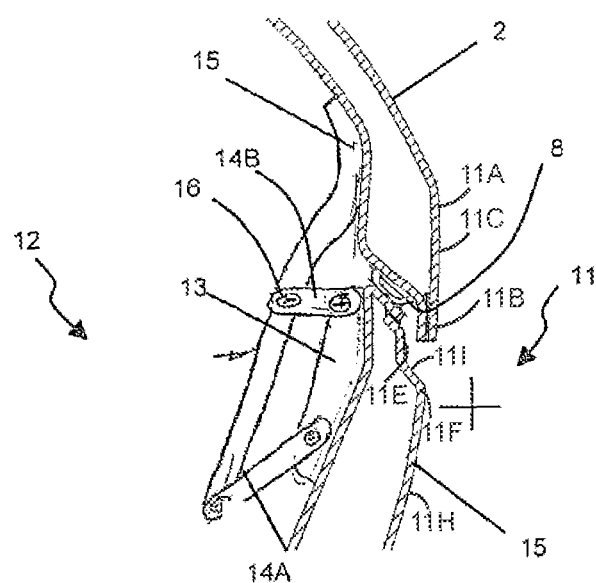
FIG. 15 illustrates a detail side elevation of the top and base sections of the roof box in a closed configuration at the hinge point using the simplified hinge of FIG. 14.

A highly simplified hinge design is shown in FIGS. 14 and 15 to illustrate the action of the hinge 12 in more detail. As shown in the detail view of FIG. 14, the hinge 12 includes a mounting bracket 13, two link arms 14A and 14B and a connecting arm 15 that links the top section 2 to the base section 3. The linkages between the arms are mechanical fasteners. When the top section 2 is opened, the hinge 12 pivots about the link arm 14A, 14B pivot points retaining the top section 2 in an orientation relative to the base section 3 that ensures the top 2 and bottom 3 sections align about the seam 4 when closed again. FIG. 15 further illustrates the hinge 12 assembly in a closed position. The seal 8 is compressed in the closed position as shown in FIG. 15. The virtual hinge line 11 is also shown in FIG. 15 being outside the roof box 1.

Dual sided opening is achieved by the connecting arm 15 of the hinge 12 or hinges 12 being fastened to the top section 2 of the roof box 1 and the mounting 13 of the hinge or hinges 12 being releasably retained within one or more housing brackets (not shown in FIGS. 14 and 15) fastened to the base section 3 of the roof box 1. In this embodiment, the hinge 12 moves in and out of the housing when the roof box 1 top section 2 is opened. This configuration is useful in applications where hinges 12 are located on either side of the roof box 1 as the top section 2 may be opened from either side. More specifically, when one side is opened, the hinge 12 or hinges 12 at the closed side of the roof box 1 remain fixed in the housing bracket or brackets (not shown in FIGS. 14 and 15) while the hinge or hinges 12 on the opposing opening side remain fixed to the top section 2 and the connecting arm(s) 15, link arms 14A, 14B and mounting 13 lift out of the housing bracket as the top section 2 is opened. When the top section 2 is closed, the mounting(s) 13 of the hinge or hinges 12 return back into the housing bracket or brackets. The top section 2 of the roof box 1 may then be opened from the opposing side reversing the above mechanics.

Figure 16:
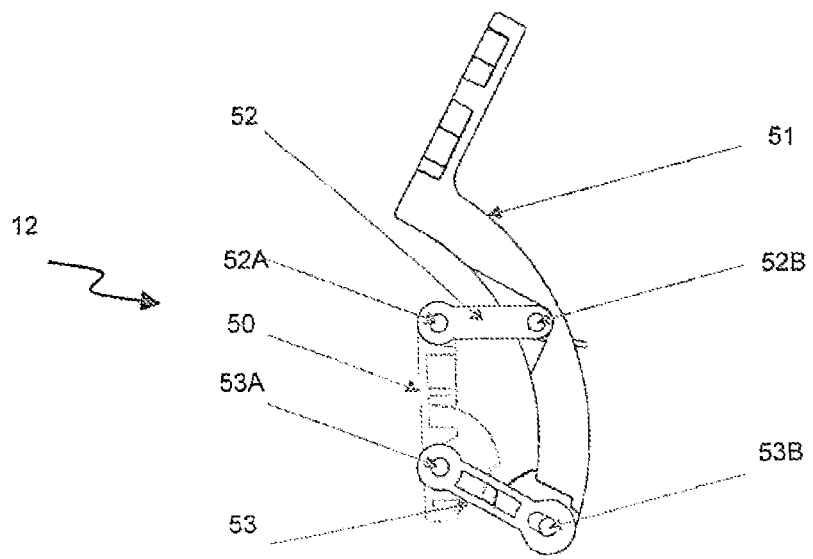
FIG. 16 illustrates a detail side elevation view of a hinge with the hinge in a relaxed state.

The hinge may also include an interlock mechanism to prevent vertical movement of the top section 2 of the roof box 1 from the base section 3. FIGS. 16 to 19 illustrate one embodiment of a hinge interlock system. FIG. 16 illustrates the hinge 12 in a relaxed position. The hinge 12 includes a mounting bracket 50 that attaches to the base section 3 e.g. via insertion into a receiving mount (not shown), an arm 51 that attaches to the top section 2 (not shown), link arms 52 and 53 and pins 52a, 52b, 53a and 53b.

Figure 17:
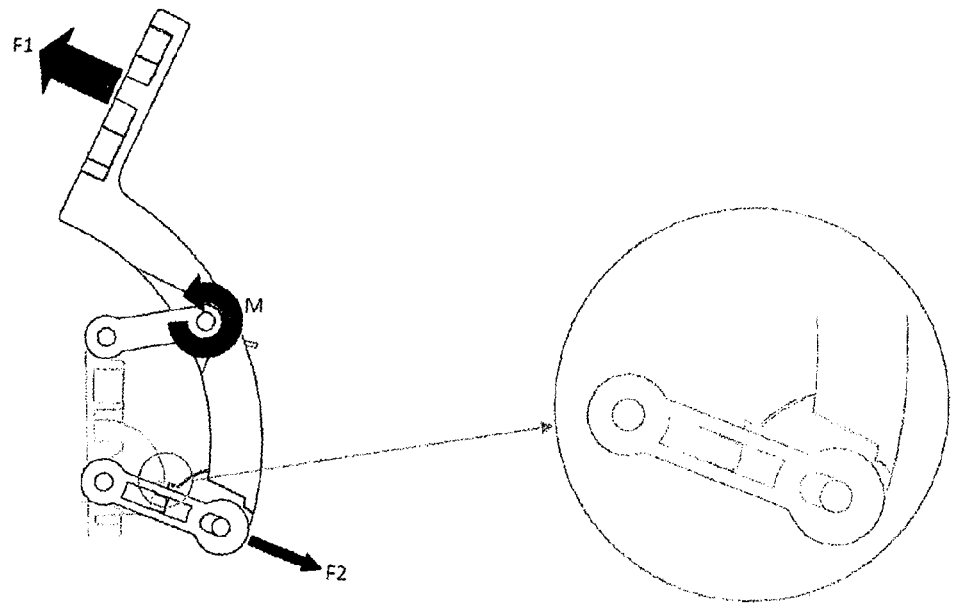
FIG. 17 illustrates the hinge action when a pivoting force is applied such as that which occurs when the roof box top section is opened from the base section.
Figure 18:
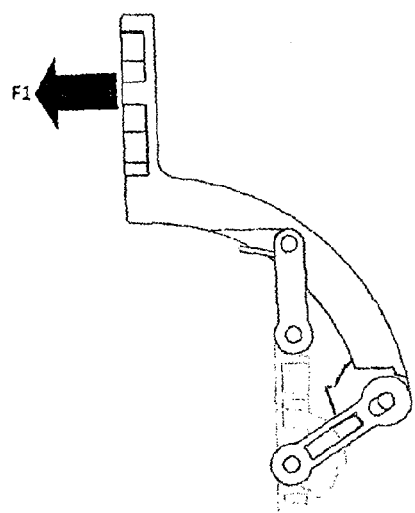
FIG. 18 illustrates the hinge action under a pivoting force when moved to an extreme opening position.

When a pivoting force marked as F1 in FIG. 17 is applied to the arm 51, a moment (marked as M in FIG. 17) is created around pin 52B in an anti-clockwise direction. This results in force F2 pushing pin 53B to the outer face of the slot in part 53. This action pulls the two catch surfaces apart (shown in the detail close up section) to avoid contact, allowing the hinge to operate unrestricted moving to full extension as shown in FIG. 18.

Figure 19:
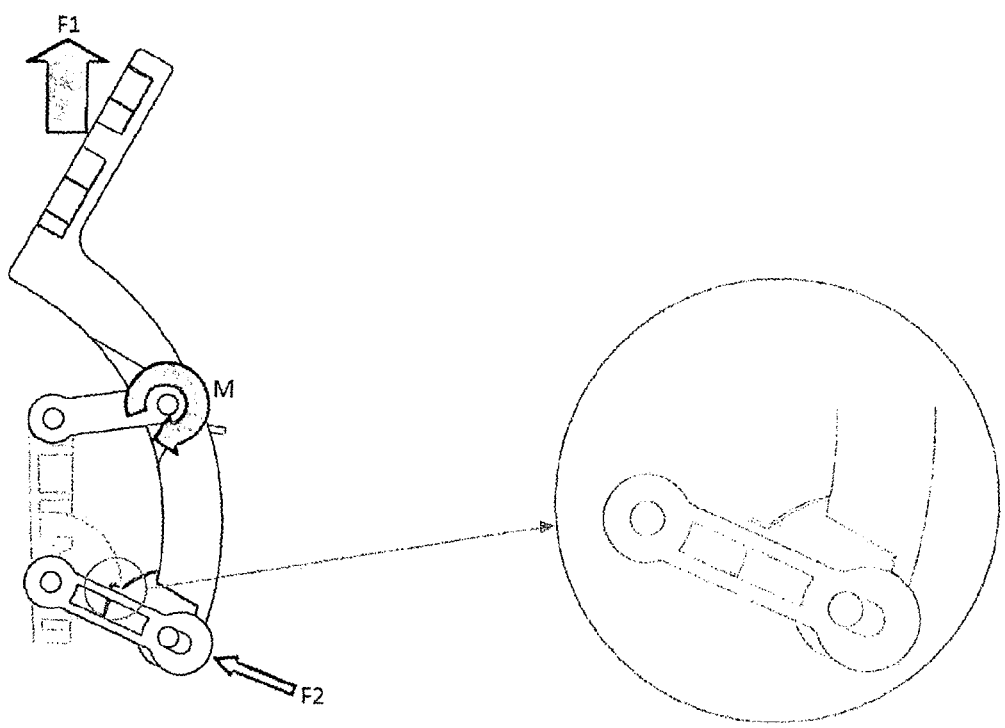
FIG. 19 illustrates the hinge action when a vertical force is applied.

FIG. 19 illustrates the action when a vertical force F1 is applied. As force F1 is applied to the arm 51, a moment M is created around pin 52B marked as M in FIG. 19 in a clockwise direction. This results in force F2 pushing pin 53B to the inner face of the slot in the link arm 53. This action pulls the two catch surfaces (shown in the detail close up section) toward each other that engage when the surfaces meet. The hinge 12 cannot open.

The difference between the application of a pivoting force and a vertical force is due to the movement of pin 53A in the slot of part 53. When a pivoting force F1 is applied to the hinge 12, the pin 53A is pressed against the outer face of the slot, holding the catch surfaces apart. When a vertical force F1 is applied to the hinge 12, the pin 53A is pressed against the inner face of the slot, engaging the catches.

FIG. 15 shows the roof box in a closed configuration and having a flush exterior seam. Upper edge portion 11B and outer surface 11C of top section 2 vertically overlap perimeter edge portion 11E and perimeter edge surface region 11I of base section 3. Also, upper edge portion 11B of top section 2 points to junction 11F. Outer surface 11C of top section 2 and main outer surface region 11H of base section 3 each extend to the same exterior seam. The roof box has a general exterior shape and transitions from outer surface 11C of the top section to main outer surface region 11H of the base section without protruding from the general exterior shape.

Optionally, the entire top section 2 may be removed altogether from the base section 3 and the base section 3 only used to convey goods. An example of where this may be useful is in the transport of unusual shaped items. The base section 3 interior still retains the item yet the item may protrude beyond the height limitations of the roof box 1 top section 2.

Advantages of the invention roof box 1 should be apparent including the removal of external seams by use of flush seams 4 and the resulting improvement in aesthetics and drag resistance resulting from the altered design. The flush seam 4 design also includes design refinements to allow ensure a snug seal 8 results along the seam 4 between the top 2 and base 3 sections of the roof box 1, achieved in part due to use of a hinge 12 design not currently used in roof boxes and modified from the art to suit the roof box 1 application. Finally, as the roof box 1 of the present invention includes use of double skinning, the box 1 can easily withstand the loadings required under normal roof box 1 operation; has a rigidity the same or better than existing art designs; and does not have the weight that a single moulded equivalent box would have.

Aspects of the present invention have been described by way of example only and it should be appreciated that modifications and additions may be made thereto without departing from the scope of the claims herein.

What is claimed is:

1. A roof box for carrying cargo on top of a vehicle c comprising
    a base section including clamps for mounting the box on cross bars on top of a vehicle, the base section having an outer surface including a main outer surface region and a perimeter edge surface region that bends inward from the main outer surface region to form an inward offset, and
    a top section hinged to the base section and configured for opening and closing the roof box, the top section having an upper edge portion that vertically overlaps the inward offset of the perimeter edge surface region of the base section when the box is closed, such that the base section and top section form a substantially flush exterior seam;
    wherein the exterior seam extends continuously around the perimeter of the box.

2. The roof box of claim 1, wherein the top section is fully double skinned.

3. The roof box of claim 1, wherein a portion of the base section is double skinned.

4. The roof box of claim 3, wherein the double skinned portion forms internal ribs.

5. The roof box of claim 1, further comprising a seal adhered to the base section or the top section near the seam forming a substantial barrier to prevent egress of debris and water.

6. The roof box of claim 5, wherein the seal is adhered to the base section.

7. The roof box of claim 1, wherein the box has two opposing long sides, the top section being connected to the base section along at least one of the long sides by two hinge assemblies.

8. The roof box of claim 7, wherein each hinge assembly includes two linkage arms.

9. The roof box of claim 1, wherein the box has two opposing long sides, the top section being connected to the base section along each of the two long sides by two hinge assemblies.

10. The roof box of claim 9, wherein each hinge assembly is also functional as a latch so that the box may be opened from either side.

11. The roof box of claim 1, wherein the top section has an inner skin and an outer skin mated together to form the upper edge portion of the top section.

12. The roof box of claim 11, wherein the inner and outer skin are fastened together via a bonding glue.

13. The roof box of claim 1, wherein the exterior seam extends continuously from a front end to a rear end of the roof box.

\* \* \* \* \*